US010337895B2

(12) United States Patent
Hopper

(10) Patent No.: US 10,337,895 B2
(45) Date of Patent: Jul. 2, 2019

(54) ASSEMBLY FOR CONTROL AND/OR MEASUREMENT OF FLUID FLOW

(71) Applicant: Cameron International Corporation, Houston, TX (US)

(72) Inventor: Hans Paul Hopper, Aberdeen (GB)

(73) Assignee: Cameron International Corporation, Houston, TX (US)

(*) Notice: Subject to any disclaimer, the term of this patent is extended or adjusted under 35 U.S.C. 154(b) by 7 days.

(21) Appl. No.: 15/680,601

(22) Filed: Aug. 18, 2017

(65) Prior Publication Data

US 2018/0073901 A1 Mar. 15, 2018

(51) Int. Cl.
G01F 1/40 (2006.01)
E21B 43/12 (2006.01)
F15D 1/02 (2006.01)

(52) U.S. Cl.
CPC ............... G01F 1/40 (2013.01); E21B 43/12 (2013.01); F15D 1/025 (2013.01)

(58) Field of Classification Search
CPC ................ G01F 1/68; G01F 1/12; G01F 1/40
See application file for complete search history.

(56) References Cited

U.S. PATENT DOCUMENTS 5,004,484 A 4/1991 Stirling et al.
6,591,674 B2 * 7/2003 Gehman ............... G01F 1/6842
73/204.21

(Continued)

FOREIGN PATENT DOCUMENTS

CN 104226133 A 12/2014
EP 1203888 A1 5/2002
WO 20150160695 A1 10/2015

OTHER PUBLICATIONS

Great Britain Office Action for GB Application No. 1614215.0 dated Feb. 8, 2017; 8 Pages.

(Continued)

Primary Examiner — Jewel V Dowtin
(74) Attorney, Agent, or Firm — Fletcher Yoder, P.C.

(57) ABSTRACT

An assembly for the control of the flow of a fluid stream is provided, the assembly comprising a fluid flow conduit having a longitudinal axis; an inlet in the conduit for the fluid stream being processed; an outlet in the conduit for the fluid stream being processed; a control fluid feed assembly having an inlet for a control fluid; wherein the conduit comprises a control portion having one or more apertures therein, the control portion being disposed between the inlet and the outlet of the conduit, the one or more apertures being in flow communication with the inlet for the control fluid in the flow control assembly and extending in a direction at an angle to the longitudinal axis of the fluid flow conduit; whereby in use the control fluid supplied to the inlet of the control fluid assembly is caused to flow into the conduit through the one or more apertures. A method for the control of the flow of a fluid stream comprises causing the fluid stream to flow through a flow control zone from an inlet to an outlet in a first direction; introducing a flow of a control fluid into the flow control zone through one or more apertures at a pressure above the pressure of the fluid stream, whereby the control fluid flows into the fluid control zone at an angle to the first direction to thereby cause a restriction to the flow of the fluid stream through the flow control zone in the first direction.

20 Claims, 13 Drawing Sheets

(56) References Cited

U.S. PATENT DOCUMENTS

| | | | |
|---|---|---|---|
| 7,121,139 B2* | 10/2006 | Shajii | G01F 1/6847 |
| | | | 73/202.5 |
| 7,474,968 B2* | 1/2009 | Ding | G01F 25/0038 |
| | | | 702/100 |
| 8,752,628 B2 | 6/2014 | Zhao et al. | |
| 8,826,731 B2* | 9/2014 | Speldrich | F17D 1/00 |
| | | | 73/204.21 |
| 2003/0178732 A1 | 9/2003 | Luman | |
| 2004/0083807 A1* | 5/2004 | Mudd | G01F 1/86 |
| | | | 73/204.21 |
| 2005/0173336 A1 | 8/2005 | Arnaud | |
| 2008/0016957 A1* | 1/2008 | Suzuki | G01F 1/6842 |
| | | | 73/204.21 |

OTHER PUBLICATIONS

Pegler Yorkshire, Female branch tee, push-fit ends, Date; Jan. 14, 2015, Accessed Feb. 2, 2017, http://www.pegleryorkshire.co.uk/EN/Brands/Tectite/316/Fittings/product/TS30_Female_branch_tee_.

PCT International Search Report & Written Opinion for PCT Application No. PCT/US2017/047659 dated Nov. 24, 2017; 14 Pages.

\* cited by examiner

ASSEMBLY FOR CONTROL AND/OR MEASUREMENT OF FLUID FLOW

CROSS REFERENCE TO RELATED APPLICATION

This application claims priority to and benefit of GB Patent Application No. 1614215.0, entitled "ASSEMBLY FOR CONTROL AND/OR MEASUREMENT OF FLUID FLOW", filed Aug. 19, 2016, which is herein incorporated by reference in its entirety.

BACKGROUND

This section is intended to introduce the reader to various aspects of art that may be related to various aspects of the present technique, which are described and/or claimed below. This discussion is believed to be helpful in providing the reader with background information to facilitate a better understanding of the various aspects of the present technique. Accordingly, it should be understood that these statements are to be read in this light, and not as admissions of prior art.

Aspects of the present technique relate to an assembly for use in the control and/or the measurement of the flow of a fluid in a conduit.

A range of assemblies are known for controlling the flow of a fluid through a conduit and include a range of valves, such as gate valves, ball valves and butterfly valves, as well as a range of choke assemblies. These known assemblies rely on the use of one or more moveable mechanical components to vary the cross-sectional area of the flow path available to the fluid through the assembly. For example, a gate valve comprises a valve gate moveable between a closed position, in which the flow path through the gate valve is closed preventing fluid flow therethrough, and an open position, in which the flow path through the valve is open allowing the full flow of fluid therethrough. A common form of choke assembly comprises a cage having openings in the wall thereof, through which the fluid flowing through the choke is caused to flow. A closure member, for example a plug or sleeve disposed within the cage, is moveable with respect to the cage and may be positioned to cover some, all or none of the openings in the choke. In this way, the position of the closure member relative to the cage controls the number of openings available for the flow of fluid and, hence, the cross-sectional area available for fluid flow through the choke assembly.

The aforementioned assemblies rely on moveable components for changing the cross-sectional area available for the flow of a fluid through the assembly, as noted. As a consequence, one or more components of the assembly are exposed to the flowing fluid. For example, in a gate valve, the gate is exposed to the flow of fluid in any position other than the fully open or fully closed position. Similarly, in a choke assembly, the moveable closure member, such as the plug or sleeve, is contacted by the fluid flowing through the assembly. As a result, these components are subjected to wear and erosion by the flowing fluid. The rate of wear and erosion is particularly high when the fluid stream is a multiphase fluid stream, especially when the fluid stream contains entrained solid material. An example of such a multiphase fluid stream is the fluid produced from a subterranean well, which typically comprises a gaseous phase, one or more liquid phases, such as oil and water, and entrained solids, such as sand, gravel and debris from the well.

There is a need for an improved assembly to control the flow of fluid in a conduit. It would be advantageous if the assembly could handle a wide range of fluid streams, in particular erosive fluid streams, such as those produced from subterranean wells, with minimum wear on the components of the assembly. It would also be advantageous if the assembly could provide for the measurement of the fluid flow in the conduit, in addition to the control of the fluid flow.

BRIEF DESCRIPTION OF THE DRAWINGS

Various features, aspects, and advantages of the present technique will become better understood when the following detailed description is read with reference to the accompanying figures in which like characters represent like parts throughout the figures, wherein:

FIG. 2A is a cross-sectional view of the annular chamber of FIG. 2 along line A-A;

FIG. 2B is a cross-sectional view of the annular chamber of FIG. 2 along line B-B;

FIG. 2C is a cross-sectional view of the annular chamber of FIG. 2 along line C-C;

FIG. 2D is a cross-sectional view of the annular chamber of FIG. 2 along line D-D;

DETAILED DESCRIPTION OF SPECIFIC EMBODIMENTS

Figure 1:
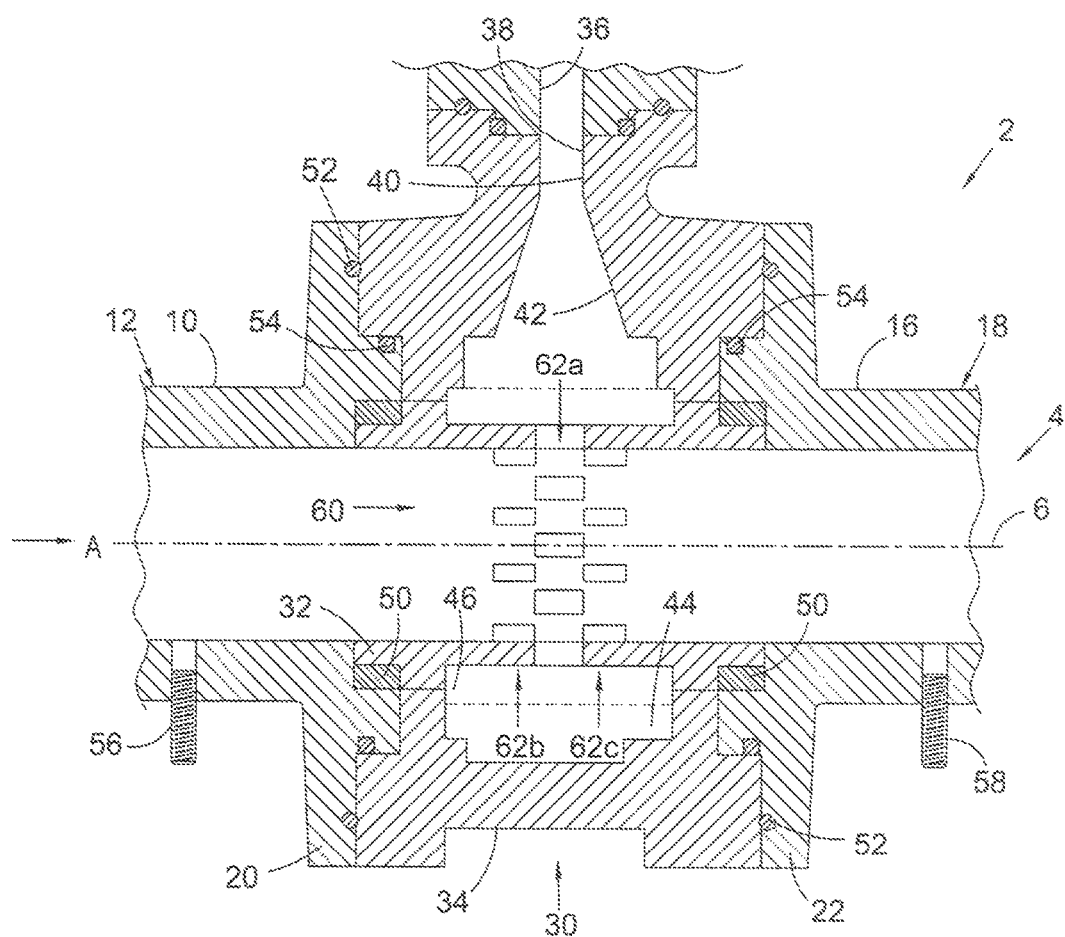
FIG. 1 is a cross-sectional view of one embodiment of the assembly of the present technique.

One or more specific embodiments of the present technique will be described below. These described embodiments are only exemplary of the present technique. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In a first aspect, the present technique provides an assembly for the control of the flow of a fluid stream, the assembly comprising: a fluid flow conduit having a longitudinal axis; an inlet in the conduit for the fluid stream being processed; an outlet in the conduit for the fluid stream being processed; a control fluid feed assembly having an inlet for a control fluid; wherein the conduit comprises a control portion having one or more apertures therein, the control portion being disposed between the inlet and the outlet of the conduit, the one or more apertures being in flow communication with the inlet for the control fluid in the flow control assembly and extending in a direction at an angle to the longitudinal axis of the fluid flow conduit; whereby in use the control fluid supplied to the inlet of the control fluid assembly is caused to flow into the conduit through the one or more apertures.

In a second aspect, the present technique provides a method for the control of the flow of a fluid stream, the method comprising: causing the fluid stream to flow through a flow control zone from an inlet to an outlet in a first direction; providing a flow of a control fluid into the flow control zone through one or more openings at a pressure above the pressure of the fluid stream, whereby the control fluid flows into the fluid control zone at an angle to the first direction to thereby cause a restriction to the flow of the fluid stream through the flow control zone in the first direction.

In the assembly and method of the present technique, the flow of the fluid stream is controlled by the action of the control fluid on the flow of the fluid stream. The control fluid is introduced into the fluid control zone at a pressure above the pressure of the fluid stream being processed. The action of the control fluid entering the flow control zone causes a restriction, that is a reduction in the effective cross-sectional area of the flow control zone available for the flow of the fluid stream being controlled. This in turn reduces the flow rate of the fluid stream. More particularly, the flow of control fluid into the flow control zone can be considered to form a fluid venturi, through which the fluid stream being processed is required to flow. The flow rate of the fluid stream can thus be controlled by varying the pressure and flow rate of the control fluid entering the flow control zone, thereby varying the cross-sectional area of the fluid venturi in the flow control zone.

An advantage of the assembly of the present technique is that the flow of the fluid stream can be controlled without the need for moving components, in contrast to known valve and choke assemblies. This eliminates the wear on the moving components, in turn increasing the effective operating life of the assembly and reducing the need for maintenance and/or replacement. The assembly of the present technique is particularly suitable for controlling the flow of fluid streams that are erosive, in particular fluid streams comprising two or more fluid phases and fluid streams comprise entrained solids.

The assembly and method of the present technique may be used to control the flow of a wide range of fluid streams. The fluid stream may consist of a single phase of fluid, for example liquid or gas. Alternatively, the fluid stream may comprise two or more fluid phases, for example one or more liquid phases and/or a gas phase. The fluid stream may comprise entrained solids.

The assembly and method of the present technique are particularly advantageous application in fluid streams produced from subterranean wells, for example subterranean oil and gas wells. Fluid streams produced from oil and gas wells typically comprise at least one fluid phase, in many cases two or more fluid phases, for example water, oil and gas. In addition, fluid streams produced from subterranean wells typically comprise entrained solids, including entrained sand and gravel and/or metal particles from downhole equipment. The method and assembly of the present technique are particularly advantageous in the control of fluid streams produced from oil and gas wells comprising one or more liquid phases, a gas phase and entrained solids.

The assembly of the present technique comprises a fluid conduit. The fluid stream to be controlled passes along the fluid conduit from an inlet to an outlet. The conduit can be considered to have a longitudinal axis along which the fluid stream flows in operation. The conduit may have any suitable form. In one preferred embodiment, the longitudinal axis of the conduit lies on a substantially straight line, preferably with the inlet and the outlet lying on the longitudinal axis, the fluid stream being processed flowing along a path parallel to and along this axis. Preferably, the conduit is tubular, with the inlet and the outlet being formed by the ends of the tubular conduit, with a cylindrical conduit being a particularly preferred arrangement.

The conduit comprises a control portion having one or more apertures therein. In operation, a control fluid is introduced into the conduit through the one or more apertures, as described in more detail below. The conduit may comprise a single conduit member extending between the inlet and the outlet, with the one or more apertures of the control portion formed in the conduit member. Alternatively, the control portion may be provided as a separate portion of the conduit, for example by way of the embodiment described below.

The conduit preferably has a wall of sufficient thickness, at least in the region of the one or more apertures, to provide a clean jet of control fluid passing through each aperture and entering the conduit, that is a jet that is not affected by the effects of the edges of the aperture. The wall thickness required to provide a clean jet is one that provides a sufficiently long fluid flow path through the aperture to provide a stable fluid flow pattern. This will depend upon the operating conditions of the assembly, such as the properties of the fluids and the operating parameters, such as fluid pressure.

Suitable materials for forming the conduit are metals, in particular steel, for example high grade steel, tungsten or composite. In one embodiment, to provide the conduit wall with a sufficient thickness to form the flow of control fluid into a jet at each aperture, the conduit is formed, at least in the region providing the control portion, from an inner conduit layer and an outer conduit layer. The inner and outer layers may be formed from the same or different materials. For example, the inner conduit layer may be formed from a hard or resistant material, such as tungsten or a nickel-chromium-based alloy (such as Inconel™) and the outer conduit layer formed from a softer material, for example stainless steel.

More preferably, the conduit comprises first conduit member, a second conduit member and a control fluid inlet member, with the one or more apertures provided in the control fluid inlet member. The inlet is formed in the first conduit member. The outlet is formed in the second conduit member. The control fluid inlet member is disposed between the first conduit member and the second conduit member. In operation, fluid to be controlled enters through the inlet, flows through the first conduit member, enters the control fluid inlet member, flows through the second conduit member and leaves the conduit through the outlet. In one preferred arrangement, the first conduit member, the control fluid inlet member and the second conduit member are aligned and arranged coaxially about a single longitudinal axis.

References herein to an 'upstream' position or direction and a 'downstream' position or direction within the conduit are references relative to the direction of flow of the fluid stream being controlled from the inlet to the outlet.

The first and second conduit members may be formed from the same material or from different materials. Preferably, the first and second conduit members are formed from the same material. Suitable materials for forming the first and second conduit members are metals, in particular steel, for example high grade steel or stainless steel. Preferably, the control fluid inlet member is formed from a hard material, such as tungsten or a nickel-chromium-based alloy. The action of a control fluid entering the conduit through the one or more apertures can be erosive and the material of the control fluid inlet member is preferably hard enough to resist such erosion. Examples of suitable hard materials are hard metals, for example tungsten and nickel-chromium-based alloys. An advantage of employing a separate control fluid inlet member is that it may be formed from a hard material to resist the aforementioned erosion, while the first and second conduit members may be formed of a less hard material, which may be easier to work and form, for example by such techniques as forging. The control fluid inlet member may be lined with a hard material, for example a nickel-chromium-based alloy, such as Inconel™.

The assembly comprises a control fluid feed assembly having an inlet for the control fluid, through which a control fluid is introduced during operation. The inlet is in communication with the one or more apertures in the conduit, such that the control fluid flows from the control fluid inlet of the control fluid feed assembly, through the one or more apertures and into the conduit.

The control fluid feed assembly comprises a control fluid conduit extending between the inlet and the one or more apertures. In embodiments in which the conduit comprises a first conduit member, a second conduit member and a control fluid inlet member, the control fluid inlet member may be comprised in the control fluid feed assembly. More preferably, the control fluid inlet member is a separate component from the control fluid feed assembly. In embodiments in which the conduit comprises a first conduit member, a second conduit member and a control fluid inlet member, the control fluid feed assembly may be provided between the first conduit member and the second member, for example mounted between flanges extending from each of the first conduit member and the second conduit member.

As noted, the control fluid feed assembly comprises a control fluid conduit extending between the inlet for the control fluid and the one or more apertures in the conduit. In one preferred embodiment, the control fluid conduit comprises a chamber disposed between the inlet for the control fluid and the one or more apertures, the chamber preferably extending at least partially around the control portion of the conduit comprising the one or more apertures. In a particularly preferred embodiment, the chamber is an annular chamber extending around the portion of the conduit comprising the one or more apertures. In this way, the control fluid flows from the inlet into the chamber surrounding the control portion and can be more evenly distributed around the said portion of the conduit, in turn providing improved control over the fluid stream. This is particularly advantageous when a plurality of spaced apart apertures are employed, as discussed in more detail hereinafter.

The annular chamber may have a uniform cross-sectional area along its length. More preferably, the annular chamber is tapered in the direction of flow of the control fluid along the chamber around the conduit, in particular such that the cross-sectional area of the chamber decreases in the direction of flow of the control fluid around the conduit. In this way, a more uniform flow of control fluid through a plurality of apertures may be achieved, in turn leading to an improved control of the flow of the fluid stream within the conduit.

The control fluid conduit in the region of the opening into the chamber may extend perpendicular to the conduit. In one preferred embodiment, the region of the control fluid conduit at the opening into the chamber extends at an acute angle to the longitudinal axis of the control portion of the conduit, to thereby direct the control fluid around the conduit within the annular chamber. Preferably, the region of the control fluid conduit at the opening of the annular chamber extends tangentially to the chamber.

As noted above, a portion of the conduit comprises one or more apertures. In operation, a control fluid is introduced under pressure through the one or more apertures into the conduit. The assembly may comprise a single aperture in the conduit. More preferably, the assembly comprises a plurality of apertures. In one embodiment, the plurality of apertures are arranged in a single row extending circumferentially around the conduit. In an alternative embodiment, the plurality of apertures are arranged in a plurality of circumferential rows. The number of rows of apertures will vary according to the nature of the fluid control required. For example, the conduit may be provided with two rows of apertures. Alternatively, the conduit may be provided with three rows of apertures. A greater number of rows of apertures may be employed, depending upon the control required. Preferably, the apertures in one row are offset around the circumference of the conduit with respect to the apertures in the or each adjacent row. Adjacent rows may be spaced apart from each other, that is a continuous land of material may extend between the adjacent rows of apertures. Alternatively, with the apertures in adjacent rows offset from each other around the circumference, the rows of apertures may overlap, that is one or more apertures in one row may lie partially between two adjacent apertures in the adjacent row. More preferably, adjacent rows of apertures abut one another, that is the apertures in one row have an edge lying on a line extending around the circumference of the conduit, with the apertures in the adjacent row also having an edge lying on the said line.

The conduit is provided with one or more apertures therein, as noted above. In operation, control fluid is introduced into the conduit under pressure through the one or more apertures. The effect is to generate a flow of control fluid within the conduit that reduces the effective cross-sectional area of the conduit to the flow of the fluid stream being controlled.

The cross-section of the or each aperture may be of any suitable shape, for example circular. In a preferred embodiment, the or each aperture is a quadrilateral in shape, for example a rectangle or a square. A preferred form for the or each aperture is a rectangle. The cross-section of the or each aperture may be arranged in any orientation relative to the direction of flow of the fluid stream being controlled through the conduit. In the case of elongate apertures, that is an aperture having a cross-section with a length greater than its width, the aperture preferably extends with its length, that is its major longitudinal axis, parallel to the direction of flow of the fluid stream along the conduit. In a preferred embodiment, the or each aperture extends with its major longitudinal axis parallel to the longitudinal axis of the conduit.

In embodiments comprising a plurality of apertures in the conduit, the apertures may have different forms. More preferably, the apertures have the same form, that is the same general cross-sectional shape.

In embodiments comprising a plurality of apertures in the conduit, the apertures may have the same cross-sectional area. Alternatively, apertures having two or more different cross-sectional areas may be provided. If the plurality of apertures are arranged in a single circumferential row, the apertures preferably have the same cross-sectional area. In one preferred embodiment, in which the plurality of apertures are arranged in a plurality of circumferential rows, as noted above, preferably the apertures in each row have the same cross-sectional area. The cross-sectional area of the apertures in different rows may be the same. More preferably, the apertures in one row have a different cross-sectional area to the apertures in another row, preferably an adjacent row.

In one preferred embodiment, the conduit is provided with one or more first rows and one or more second rows, with the one or more second rows being either upstream and/or downstream of the one or more first rows. In one embodiment, the conduit is provided with one or more first rows of apertures, one or more second rows of apertures disposed upstream of the one or more first rows and one or more second rows of apertures disposed downstream of the one or more first rows.

The apertures in the one or more second rows may have the same or different cross-sectional areas, preferably the same. The number and/or cross-sectional area of the apertures in the one or more second rows is preferably different to that of the apertures in the one or more first rows, preferably with the apertures in the one or more second rows having a smaller cross-sectional area than the apertures in the one or more first rows. The total cross-sectional area of the apertures in the one or more second rows is preferably less than the total cross-sectional area of the apertures in the one or more first rows.

In another preferred embodiment, the conduit is provided with one or more first rows, one or more second rows upstream and/or downstream of the one or more first rows, and one or more third rows upstream and/or downstream of the one or more second rows. In one embodiment, the conduit is provided with one or more first rows of apertures, one or more second rows of apertures upstream of the one or more first rows, one or more second rows of apertures downstream of the one or more first rows and one or more third rows of apertures upstream or downstream, preferably downstream, of the one or more downstream second rows.

The number and/or cross-sectional area of the apertures in the first, second and third rows may be the same or different. In one embodiment, the apertures in the second and third rows each have the same cross-sectional area. Preferably, the apertures in the second and third rows each have a cross-sectional area that is smaller than the cross-sectional area of the apertures in the one or more first rows. The total cross-sectional area of the apertures in the one or more third rows is preferably less than the total cross-sectional area of the apertures in the one or more second rows.

The conduit may be further provided with one or more fourth rows of apertures, for example upstream and/or downstream of the one or more third rows. The number and/or cross-sectional area of the apertures in the first, second, third and fourth rows may be the same or different. In one embodiment, the apertures in the one or more fourth rows each have a cross-sectional area that is smaller than the cross-sectional area of the apertures in the one or more first, second and third rows. The total cross-sectional area of the apertures in the one or more fourth rows is preferably less than the total cross-sectional area of the apertures in the one or more third rows.

Further rows of apertures may be provided in the conduit in an analogous manner to that described above.

By having the number and/or size of the apertures different in the different rows and by varying the number and position of the rows, the flow pattern of the control fluid entering the conduit may be selected to shape the hydraulic restriction presented to the fluid being processed through the conduit.

The one or more apertures extend through the wall of the conduit. The one or more apertures may extend perpendicular to the wall of the conduit, that is radially inwards through the conduit wall and in a plane perpendicular to the longitudinal axis of the conduit. More preferably, the one or more apertures extend through the wall of the conduit at an angle to the radially inwards direction, that is an angle other than 0 or 90°. In the case of a plurality of apertures, the apertures may extend through the wall of the conduit at the same angle or at different angles. By having the or each aperture extending through the wall of the conduit at an angle to the radially inwards direction, the control fluid introduced into the conduit through the one or each aperture is caused to rotate within the conduit.

In one embodiment, the or a plurality of the apertures extends in a plane perpendicular to the longitudinal axis of the conduit at an angle to the radially inwards direction, preferably tangentially to the inner surface of the conduit. In this way, fluid introduced into the conduit through the said apertures is caused to rotate in a circumferential pattern within the conduit and to form a circumferential, pressurized band of rotating control fluid. The control fluid leaves the band, loses pressure and converges with the fluid flowing through the conduit.

In a preferred embodiment, the or a plurality of the apertures extends at an angle to the plane perpendicular to the longitudinal axis of the conduit and at an angle to the radially inwards direction. The or a plurality of the apertures may extend in an upstream direction or a downstream direction. In this way, fluid introduced into the conduit through the said apertures is caused to rotate in a helical pattern within the conduit to form a helical band of rotating control fluid.

In one embodiment, the or each aperture extends in an upstream direction, in which arrangement the flow of fluid introduced through the or each aperture resists the flow of fluid along the conduit. In an alternative embodiment, the or each aperture extends in a downstream direction. In this way, fluid introduced into the conduit through the one or more apertures reinforces or boosts the flow of fluid along the conduit.

In one embodiment, the conduit is provided with a first row of apertures and a second row of apertures, as described above. In such an embodiment, the apertures in the first row may extend through the wall of the conduit in a plane perpendicular to longitudinal axis of the conduit and at an angle to the radially inwards direction, so as to form a circumferential, pressurized band of rotating control fluid. The apertures in the second row can be angled to direct control fluid to hydraulically shape and/or hydraulically confine the rotating circumferential band formed by the fluid entering through the apertures in the first row. Thus, in the case that the second row of apertures is downstream of the first row of apertures, the apertures in the second row are angled in an upstream direction, towards the apertures in the first row. Similarly, in the case that the second row of apertures is upstream of the first row of apertures, the apertures in the second row are angled in a downstream angle towards the apertures in the first row. In an alternative embodiment, the conduit comprises first, second and third rows of apertures, as described above, with the second row upstream of the first row and the third row downstream of the first row. In this case, the apertures in the second row may be angled towards the apertures in the first row, that is in a downstream direction, while the apertures in the third row are angled towards the apertures in the first row, that is in an upstream direction.

In an alternative embodiment, the conduit is provided with one or more rows of apertures, with all apertures extending at an angle to the plane perpendicular to the longitudinal axis of the conduit and at an angle to the radially inwards direction, that is either in an upstream direction or a downstream direction, most preferably an upstream direction. In this way, all the apertures are arranged to direct the incoming control fluid into a rotating, spiral flow pattern within the conduit, extending either in the upstream direction or the downstream direction, most preferably the upstream direction.

As noted above, the one or more apertures may extend at an angle to the radially inwards direction and/or to the plane perpendicular to the longitudinal axis of the conduit. The or each angle may be at least 10°, preferably at least 20°, still more preferably at least 30°. It is particularly preferred that the one or more apertures extend through the wall of the conduit at a tangent to the inner surface of the conduit.

In the case of rectangular apertures extending through the wall of the conduit tangentially to the inner surface of the conduit, the inner opening of each aperture preferably has a parallelogram form with curved edges. In this way, the curvature of the inner surface of the conduit is accommodated and the aperture delivers into the conduit a flow of control fluid having a rectangular cross-sectional area.

To control the flow of the fluid stream through the conduit, the assembly is preferably provided with a pressure sensor assembly for measuring the pressure of fluid within the conduit at one or more positions along the conduit. For example, the conduit may comprise one or more pressure sensing ports therein, through which the pressure of fluid within the conduit may be measured. In one embodiment, the conduit comprises a first pressure sensing port upstream of the portion of the conduit having the one or more apertures therein and a second pressure sensing port downstream of the said portion. Suitable pressure sensors for connecting to the pressure sensing ports are known in the art and are commercially available.

As described above, the flow of the fluid stream through the conduit is controlled by injecting a control fluid into the conduit through the one or more apertures therein. The control fluid is introduced into the conduit at a pressure greater than the pressure of the fluid stream within the conduit. The flow of the control fluid may be controlled and varied, for example by a pressure regulator, such as one or more valves. The pressure regulator may be adjusted in order to provide the control fluid to the conduit at the pressure required to provide the desired control of the flow of the fluid stream within the conduit. For example, the pressure regulator may operate in response to one or more signals indicating the pressure at one or more locations within the conduit, for example one or both of upstream and downstream of the apertures.

The control fluid may be a different fluid to the fluid of the fluid stream flowing through the conduit. In this case, the control fluid is drawn from a supply, for example a reservoir of control fluid. The use of a different fluid for the control fluid allows the properties of the control fluid, for example its density, to be tailored to the control duty to be performed within the conduit. In one embodiment, the control fluid has a higher density than the fluid flowing through the conduit. The use of a higher density fluid as the control fluid allows the volume of control fluid required to be introduced into the conduit for a given level of control to be reduced.

However, as will be appreciated, operation of the assembly using a control fluid that is different in composition to the fluid flowing through the conduit results in the control fluid becoming mixed with the fluid stream and contaminating or diluting the fluid stream. Accordingly, in one preferred embodiment, the fluid used for the control fluid is the same as the fluid of the fluid stream flowing through the conduit. In this embodiment, the fluid forming the control fluid stream may be drawn from the fluid stream either upstream and/or downstream of the assembly. If the pressure of the fluid stream at the position where the fluid for the control fluid stream is separated is lower than required for the control operation, a pump may be employed to increase the pressure of the control fluid stream. This is particularly the case when the fluid for the control fluid stream is withdrawn from a position downstream of the assembly. Alternatively, the fluid forming the control fluid stream may be withdrawn from the fluid stream at a position upstream of the assembly and upstream of a pressure reduction device, such as a choke. A regulator may then be employed to adjust the pressure of the control fluid stream before it is fed to the apertures in the conduit of the assembly.

As discussed above, the assembly of the present technique finds particular use in the control of fluid streams produced from subterranean wells, for example oil and gas wells. The assembly is of particular advantage when used in wellhead assemblies in remote or inaccessible locations, such as subsea locations.

Accordingly, in a further aspect, the present technique provides a wellhead assembly for a subterranean well, for example an oil or gas well, comprising an assembly as hereinbefore described.

Embodiments of the present technique will now be described, by way of example only, having reference to the accompanying drawings.

Turning to FIG. 1, there is a shown an assembly for the control of the flow of a fluid stream according to one embodiment of the present technique. The assembly is generally indicated as 2.

The assembly 2 comprises a conduit, generally indicated as 4, having a longitudinal axis indicated by the dotted line 6. The conduit comprises a first generally cylindrical conduit member 10 having an inlet end 12 for receiving a fluid stream being processed. The conduit 4 further comprises a second generally cylindrical conduit member 16 having an outlet end 18 through which the fluid stream being processed leaves the assembly. The first and second conduit members 10, 16 are provided with respective opposing flange members 20, 22 at their inner ends, between which a fluid control assembly 30 is mounted.

In operation, a fluid stream to be controlled flows along the conduit 4 in the direction of the arrow A.

The fluid control assembly 30 comprises a generally cylindrical fluid control conduit member 32. The inner surface of the fluid control conduit member 32 is aligned with the inner surfaces of the first and second conduit members 10, 16, as shown in FIG. 1, to provide a smooth flow surface. The fluid control assembly 30 further comprises a fluid control body 34 extending around the fluid control conduit member 32. The fluid control body 34 has a control fluid inlet 36 formed by a flange member and opening into a control fluid conduit 38 formed in the body 34. The control fluid conduit 38 has a first, uniform portion 40 adjacent the inlet 36 and a second, tapered portion 42 extending from the first portion 40 and increasing in cross-sectional area in the direction away from the first portion 40. The second portion 42 of the control fluid conduit 38 openings into an annular chamber 44 formed between the fluid control body 34 and the fluid control conduit member 32 and extending around the fluid control conduit member 32.

Metal to metal seals 50 are provided between the fluid control conduit member 32 and the first and second conduit members 10, 16. Hydrostatic seals 52 and gasket seals 54 with test ports are provided between the fluid control body 34 and the first and second conduit members 10, 16. The test ports allow the integrity of the seal to be confirmed and an internal pressure test against the gasket seals 54 to be carried out. The testing of the seals 54 can also confirm proper operation when the assembly is deployed subsea and is subjected to a high pressure differential between a high external hydrostatic pressure and a lower internal process fluid pressure.

The fluid control body 34 has flange members 20, 22 of the first and second conduit members 10, 16 secured by bolts (not shown for clarity) in a conventional manner.

Each of the first and second conduit members 10, 16 is provided with a pressure and temperature sensing port 56, 58 to allow the pressure and/or temperature of fluid within the conduit to be measured.

The fluid control conduit member 32 is provided with a plurality of apertures 60, the apertures communicating the interior of the conduit 4 with the annular chamber 44 of the fluid control assembly 30. The apertures are preferably rectangular. Each aperture 60 extends through the fluid control conduit member 32 to the inner surface of the fluid control conduit member. Each aperture preferably extends tangentially to the inner surface of the fluid control conduit member. The fluid control conduit member 32 may one or a plurality of rows of apertures. In the embodiment shown in FIG. 1, the apertures 60 are arranged in three rows extending circumferentially around the fluid control conduit member 32, that is a first or central row 62a, a second row 62b arranged upstream of the first row, and a second row 62c arranged downstream of the first row.

In the arrangement shown in FIG. 1, the apertures 60 in the second rows 62b, 62c are offset from the apertures in the first, central row 62a, with the edges of the apertures in the second and third rows 62b, 62c lying along the same circumferential lines as the edges of the apertures in the first, central row 62a, that is no lands between the adjacent rows of apertures.

Different arrangements of the apertures 60 are envisaged, depending upon the control duty to be performed on the fluid stream within the conduit 4, as described in general terms hereinbefore and as exemplified in more detail below.

Figure 2:
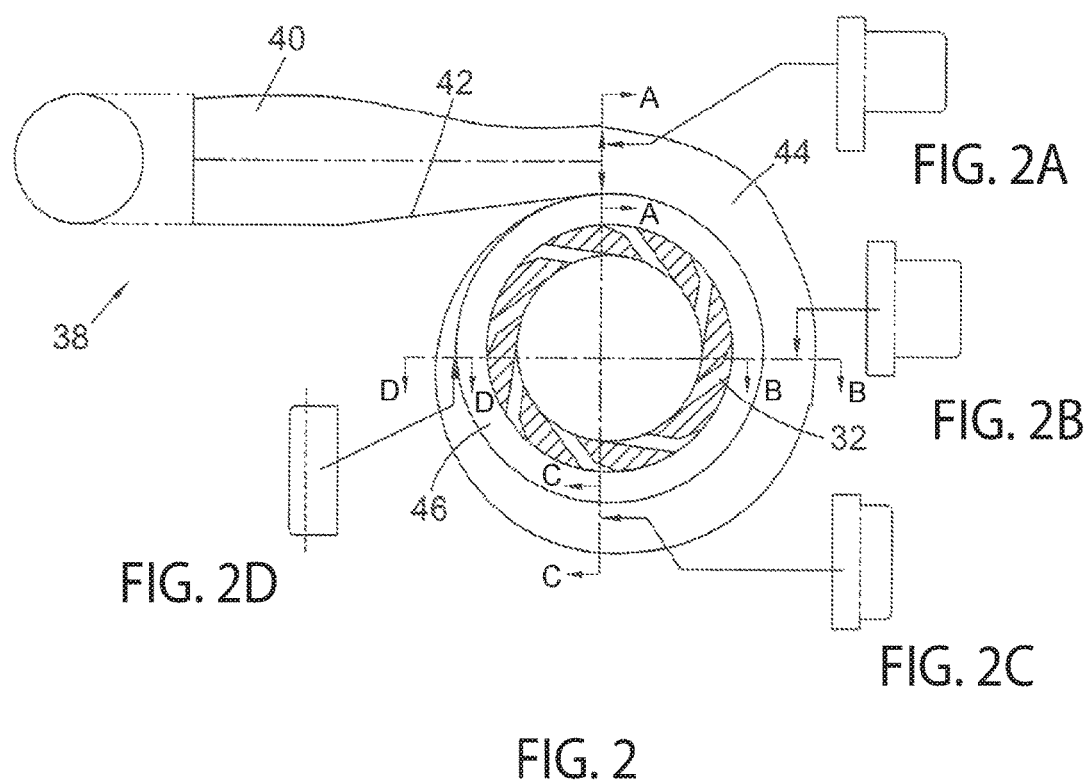
FIG. 2 is a schematic view of one embodiment of a control fluid conduit for use in the assembly of the present technique.

FIG. 2 shows a schematic cross-sectional view of the fluid control conduit 38 and the annular chamber 44 of FIG. 1, in which the variation in the cross-sectional area of the annular chamber 44 around the fluid control conduit member 32 is indicated. FIGS. 2A to 2D indicate the cross-sectional area of the annular chamber 44 at four positions around the fluid control conduit member 32, with the area at the inlet of the annular chamber 44 being taken as R. The annular chamber 44 distributes the control fluid equally to an inner annular chamber 46 that extends around and surrounds the central portion of the control conduit member 32 having the apertures 60 therein.

Figure 3A:
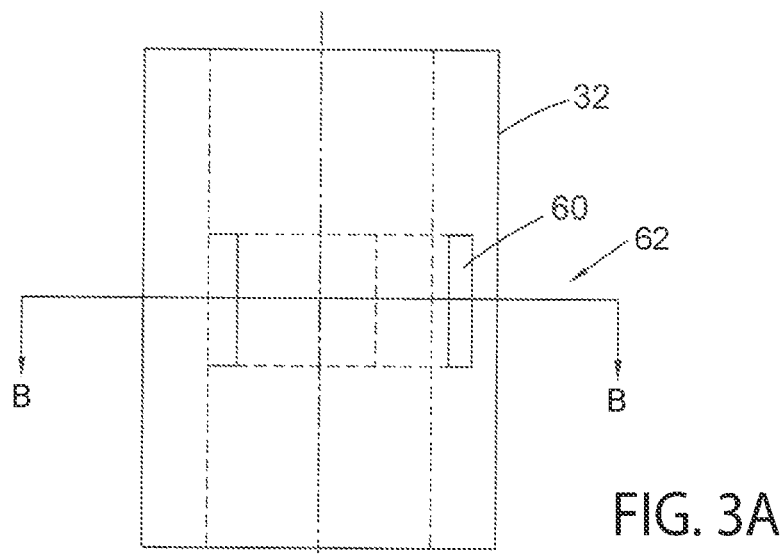
FIG. 3A is a schematic view of one embodiment of a control fluid inlet member for use in the assembly of the present technique.
Figure 3B:
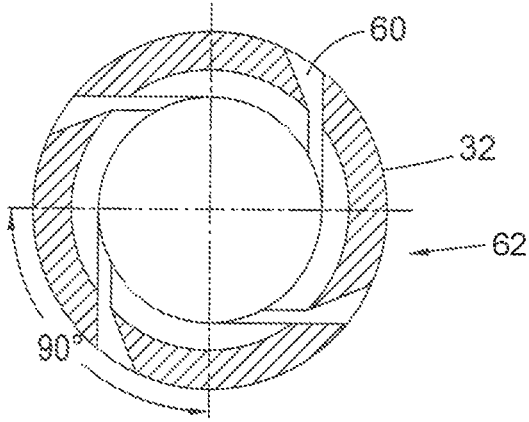
FIG. 3B is a cross-sectional view of the member of FIG. 3A along the line B-B.

An alternative arrangement of the apertures 60 in the control conduit member 32 is shown in FIGS. 3a and 3b. In this embodiment, the control conduit member 32 is provided with a single row 62 of four rectangular, tangentially-extending apertures 60. The apertures 60 are spaced equidistantly around the control conduit member 60, as can be seen in FIG. 3b.

Figure 4A:
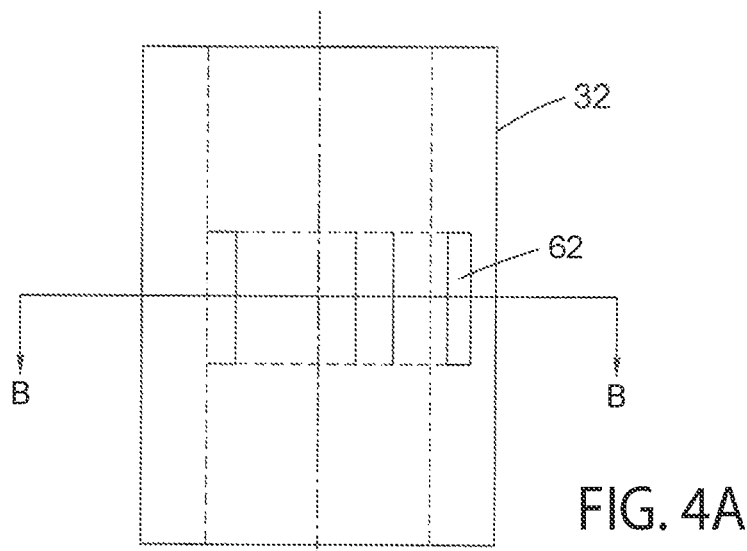
FIG. 4A is a schematic view of a further embodiment of a control fluid inlet member for use in the assembly of the present technique.
Figure 4B:
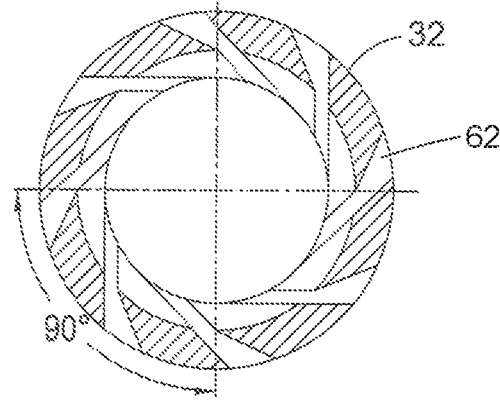
FIG. 4B is a cross-sectional view of the member of FIG. 4A along the line B-B.

A further alternative arrangement of the apertures 60 in the control conduit member 32 is shown in FIGS. 4a and 4b. In this embodiment, the control conduit member 32 is provided with a single row 62 of eight rectangular, tangentially-extending apertures 60. The apertures 60 are spaced equidistantly around the control conduit member 60, as can be seen in FIG. 4b.

Figure 5A:
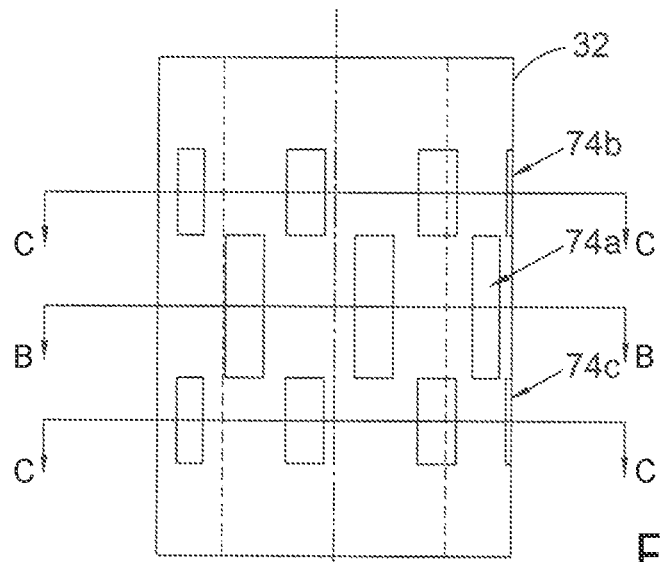
FIG. 5A is a schematic view of a further embodiment of a control fluid inlet member for use in the assembly of the present technique.
Figure 5B:
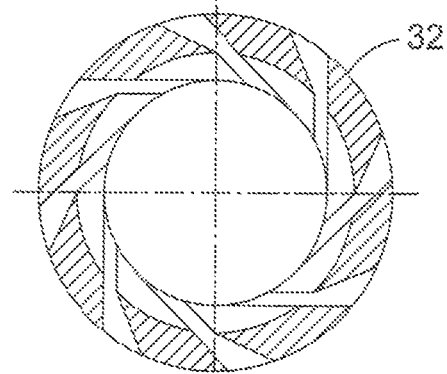
FIG. 5B is a cross-sectional view of the member of FIG. 5A along the line B-B.
Figure 5C:
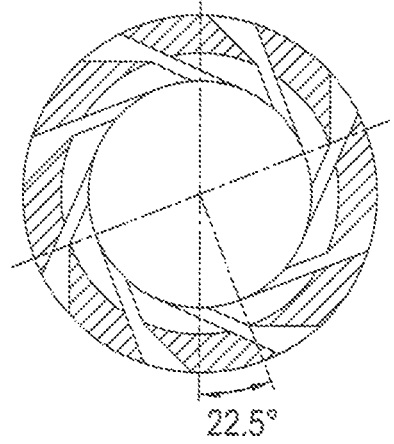
FIG. 5C is a cross-sectional view of the member of FIG. 5A along either line C-C.

A still further alternative arrangement of the apertures 60 in the control conduit member 32 is shown in FIGS. 5a, 5b and 5c. In this embodiment, the control conduit member 32 is provided with a three rows of apertures 60. Each row contains eight rectangular, tangentially-extending apertures 60. In particular, the apertures 60 are arranged in a first, central row 74a comprising eight larger apertures 60. A further row 74b, 74c of eight smaller apertures is disposed on each of the upstream side and the downstream side of the central row 62a. The apertures 60 in each of the rows 74a, 74b and 74c are spaced equidistantly around the control conduit member 60, as can be seen in FIGS. 5b and 5c. The apertures 60 in the rows 74b and 74c are offset circumferentially from the apertures 60 in the central row 74a, as can also be seen in FIGS. 5b and 5c.

Figure 6A:
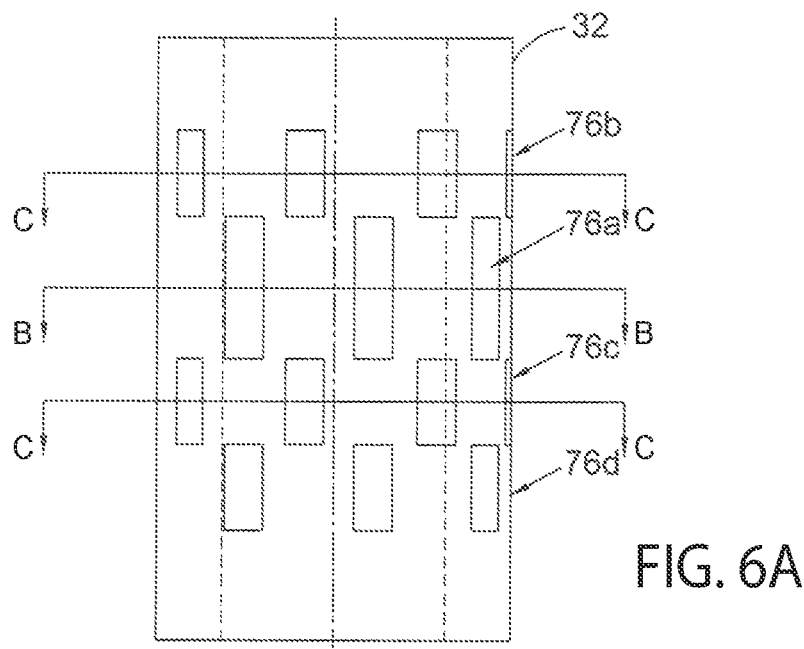
FIG. 6A is a schematic view of a further embodiment of a control fluid inlet member for use in the assembly of the present technique.
Figure 6B:
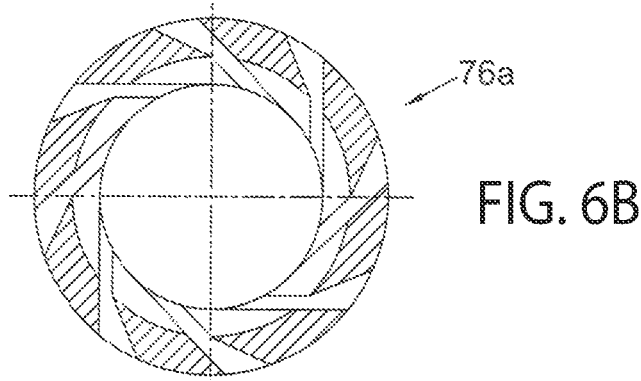
FIG. 6B is a cross-sectional view of the member of FIG. 6A along the line B-B.
Figure 6C:
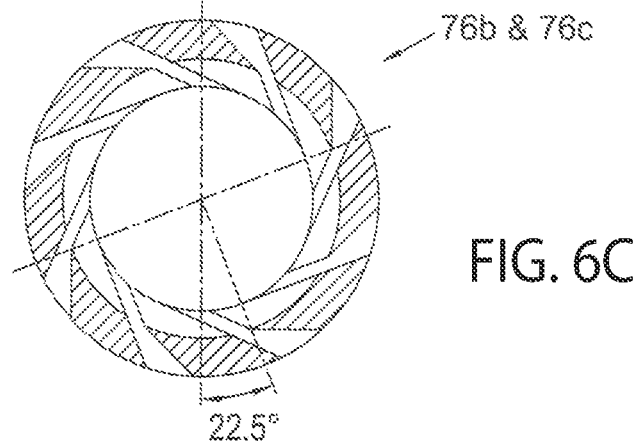
FIG. 6C is a cross-sectional view of the member of FIG. 6A along either line C-C.

A yet further alternative arrangement of the apertures 60 in the control conduit member 32 is shown in FIGS. 6a, 6b and 6c. In this embodiment, the control conduit member 32 is provided with a four rows of apertures 60. Each row contains eight rectangular, tangentially-extending apertures 60. In particular, the apertures 60 are arranged in a first, central row 76a comprising eight larger apertures 60. A further row 76b, 76c of eight smaller apertures is disposed on each of the upstream side and the downstream side of the central row 76a. A further row 76d of apertures is provided on the downstream side of the aforementioned three rows. The apertures 60 in each of the rows 76a, 76b, 76c and 76d are spaced equidistantly around the control conduit member 60, as can be seen in FIGS. 6b and 6c. The apertures 60 in the rows 76b and 76c are offset circumferentially from the apertures 60 in the central row 76a, as can also be seen in FIGS. 6b and 6c. The apertures 60 in the fourth row 76d are aligned circumferentially with the apertures 60 in the central row 76a.

Figure 7:
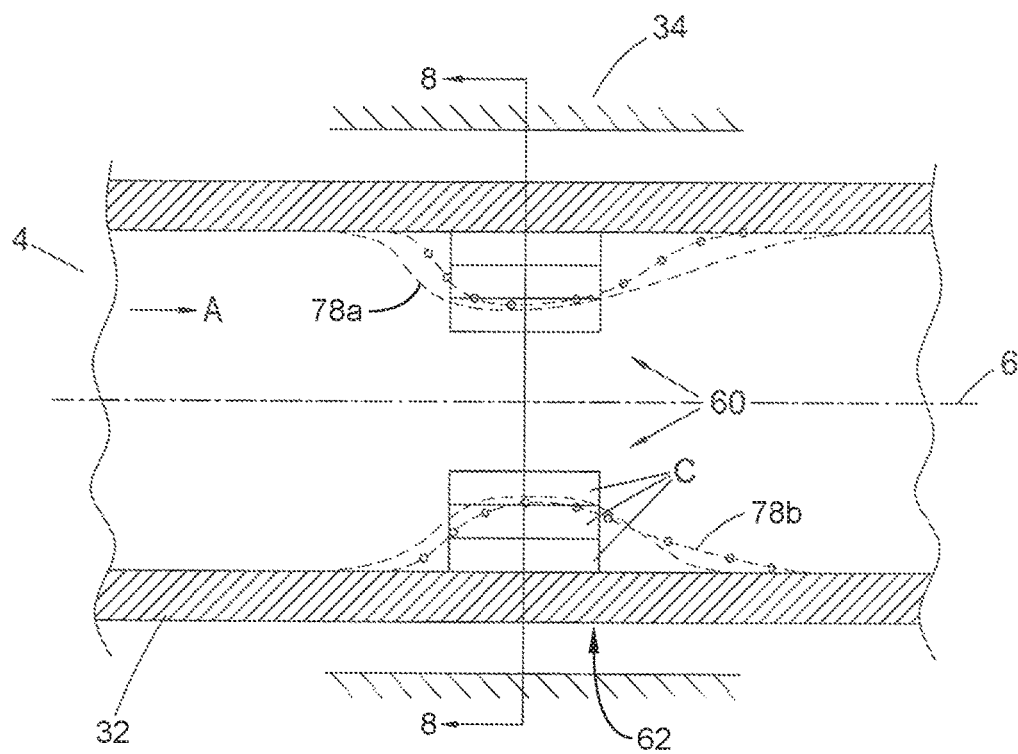
FIG. 7 is a partial cross-sectional view of a portion of the conduit of the assembly of the present technique showing one arrangement of one row of apertures therein.
Figure 8:
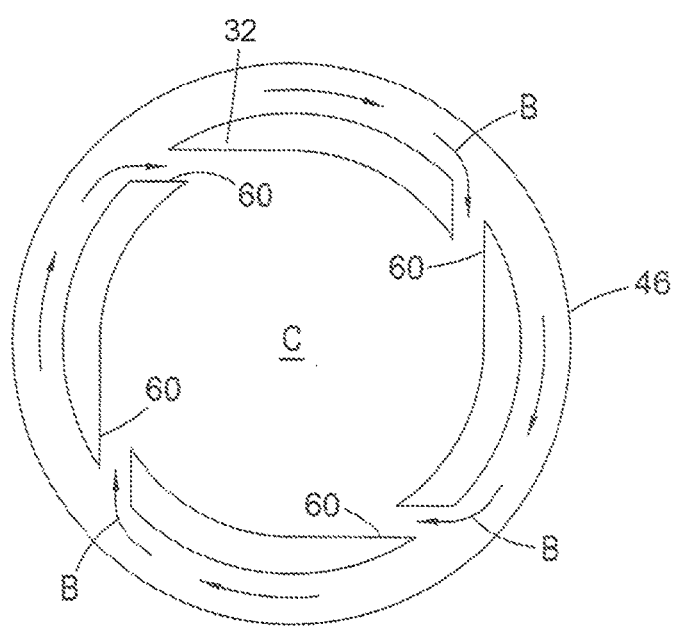
FIG. 8 is a schematic cross-sectional view of the conduit of FIG. 7 along the line 8-8.

Referring to FIG. 7, there is shown a partial view of the fluid control conduit member 32 to illustrate the operation of one embodiment of the arrangement of apertures 60 in the conduit. In the embodiment shown, a plurality of apertures 60 is arranged in a single row 62 extending circumferentially around the fluid control conduit member 32. The apertures all have the same cross-sectional area. Each aperture 60 extends radially inwards tangentially to the inner surface of the fluid control conduit member 32, as shown in the cross-sectional view of FIG. 3b. The control fluid introduced into the control conduit member 32 through the row of apertures 60 forms a single hydraulic band. The flow of control fluid through the apertures 60 is indicated by the arrows B in FIG. 8. The inwardly extending spiral flow pattern of control fluid within the conduit forms a standing wave vortex, as indicated by the dotted lines in FIG. 7.

In particular, control fluid entering the conduit through the apertures 60 forms a rotating hydraulic band extending around the inner surface of the conduit 32. This hydraulic band acts to constrict the flow path available to fluid flowing through the conduit in the direction of the arrow A. The extent to which the flow path through the conduit is restricted may be controlled by the pressure of the control fluid. At high flow rates, a larger hydraulic band is formed, indicated by the line 78a, forming a smaller hydraulic orifice through which the fluid being processed must flow. Reducing the pressure of the control fluid reduces the size of the hydraulic band, as indicated by the line 78b, in turn reducing the restriction in the bore of the conduit 32.

The arrangement of the apertures 60 in the row 72 may be duplicated in two or more further rows of apertures having the same configuration, with the apertures in adjacent rows offset from each other.

Figure 9:
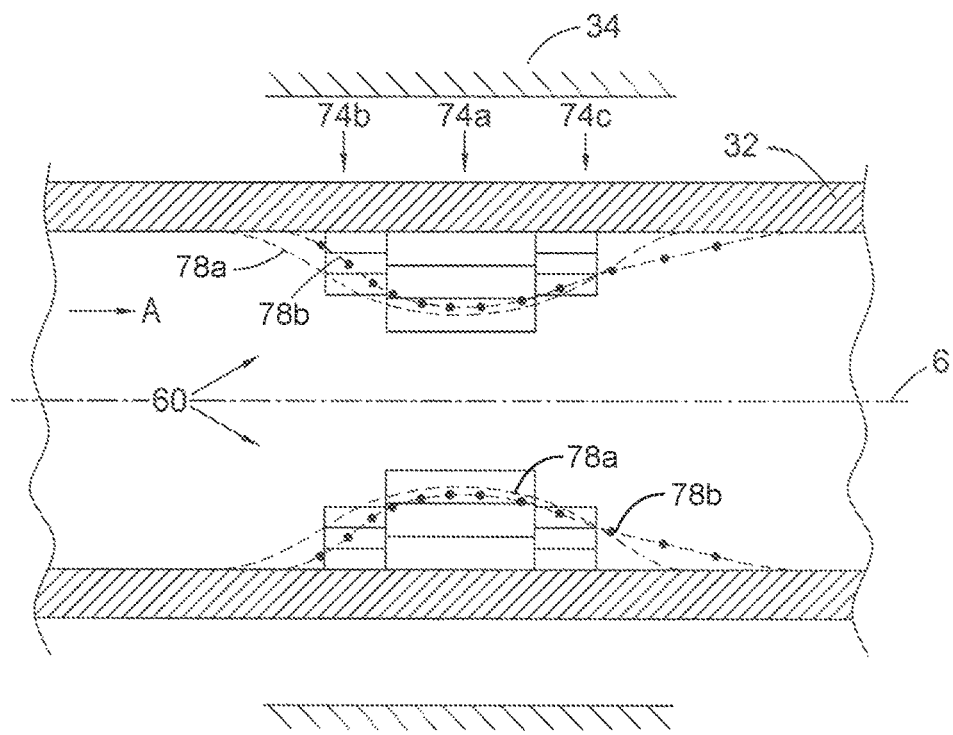
FIG. 9 is a partial cross-sectional view of a portion of the conduit of the assembly of the present technique showing an alternative arrangement of apertures therein.

Turning to FIG. 9, there is shown a partial view of the fluid control conduit member 32 to illustrate the operation of a further embodiment of the arrangement of apertures 60 in the conduit. In the embodiment shown, a plurality of apertures 60 is arranged in a plurality of rows extending circumferentially around the fluid control conduit member 32. Each aperture 60 extends radially inwards tangentially to the inner surface of the fluid control conduit member 32. The rows comprise a central row 74a, an upstream row 74b and a downstream row 74cc. The apertures in each row all have the same cross-sectional area. The apertures in the upstream row 74b and the downstream row 74c have the same cross-sectional area, with the cross-sectional are being smaller than that of the apertures in the first row 74a. The apertures 60 in the first row 74a extend radially inwards, that is in a plane perpendicular to the longitudinal axis 6 of the conduit. The apertures in the second row 74b extend in a downstream direction, while the apertures in the third row 74c extend in an upstream direction.

Control fluid entering the control conduit member 32 through each row of apertures in the arrangement shown in FIG. 9 forms a hydraulic vortex, with the hydraulic vortices cooperating. In particular, during operation, the action of control fluid entering the conduit through the apertures in the upstream and downstream rows 74b, 74c is to hydraulically confine the rotating band of control fluid entering through the apertures in the first row 74a.

Again, the extent to which the flow path through the conduit is restricted may be controlled by the pressure of the control fluid. At high flow rates, a larger hydraulic band is formed, indicated by the line 78a, forming a smaller hydraulic orifice through which the fluid being processed must flow. Reducing the pressure of the control fluid reduces the size of the hydraulic band, as indicated by the line 78b, in turn reducing the restriction in the bore of the conduit 32.

The arrangement of the apertures 60 in the rows 62a, 62b, 62c may be duplicated in two or more further rows of apertures having the same configuration, with the apertures in adjacent rows offset from each other.

Figure 10:
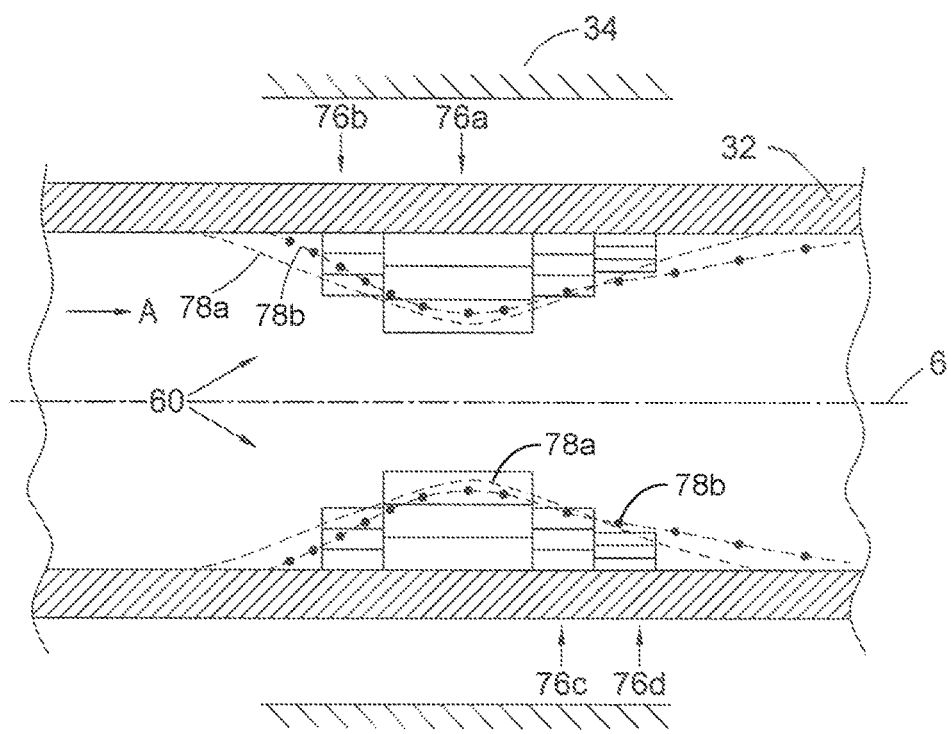
FIG. 10 is a partial cross-sectional view of a portion of the conduit of the assembly of the present technique showing a further alternative arrangement of apertures therein.

Turning now to FIG. 10, there is shown a partial view of the fluid control conduit member 32 to illustrate the operation of a still further embodiment of the arrangement of apertures 60 in the conduit. In the embodiment shown, a plurality of apertures 60 is arranged in a plurality of rows extending circumferentially around the fluid control conduit member 32. Each aperture 60 extends radially inwards tangentially to the inner surface of the fluid control conduit member 32. The rows comprise a central row 76a, an upstream row 76b and a downstream row 76c. A further downstream row 76d is disposed downstream of the row 76c. The apertures in each row all have the same cross-sectional area. The apertures in the upstream row 76a and the downstream row 76c have the same cross-sectional area, with the cross-sectional are being smaller than that of the apertures in the central row 76a. The apertures in the further downstream row 76d have a cross-sectional area that is smaller than that of the apertures in the upstream and downstream rows 74b, 74c. The apertures 60 in the central row 76a extend radially inwards, that is in a plane perpendicular to the longitudinal axis 6 of the conduit. The apertures in the upstream row 76b extend in a downstream direction, while the apertures in the two downstream rows 76c, 76d extend in an upstream direction.

Control fluid entering the control conduit member 32 through each row of apertures in the arrangement shown in FIG. 10 forms a hydraulic vortex or band, with the hydraulic bands cooperating. In particular, during operation, the action of control fluid entering the conduit through the apertures in the rows 76b, 76c, 76d is to hydraulically confine the rotating band of control fluid entering through the apertures in the first row 76a.

Again, the extent to which the flow path through the conduit is restricted may be controlled by the pressure of the control fluid. At high flow rates, a larger hydraulic band is formed, indicated by the line 78a, forming a smaller hydraulic orifice through which the fluid being processed must flow. Reducing the pressure of the control fluid reduces the size of the hydraulic band, as indicated by the line 78b, in turn reducing the restriction in the bore of the conduit 32.

The arrangement of the apertures 60 in the rows 62a, 62b, 62c, 62d may be duplicated in two or more further rows of apertures having the same configuration, with the apertures in adjacent rows offset from each other.

Figure 11:
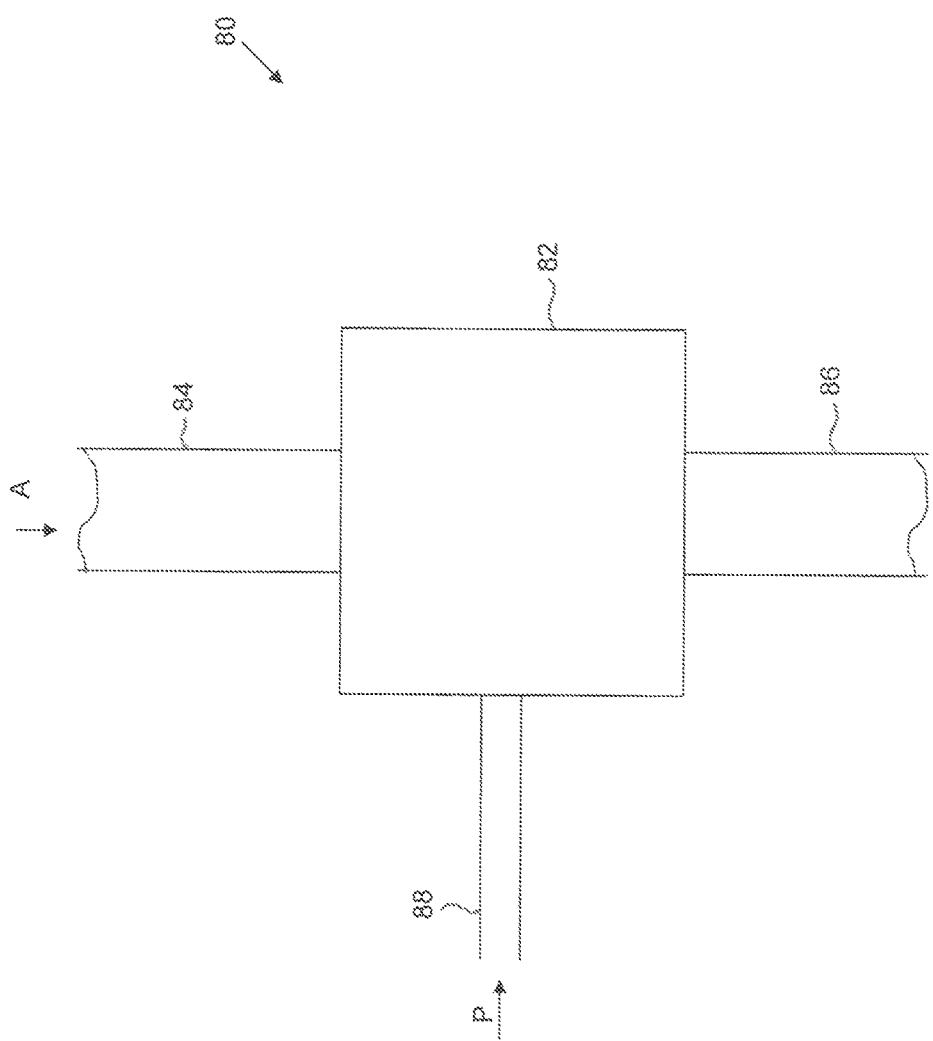
FIG. 11 is a schematic view of an installation comprising an assembly of the present technique.

Referring now to FIG. 11, one embodiment of an installation comprising an assembly of the present technique is illustrated. The installation, generally indicated as 80, may be a wellhead assembly and comprises an assembly 82 of the present technique, for example as shown in FIG. 1 and described hereinbefore. A fluid stream being processed is fed to the fluid stream inlet of the assembly 82 by a line 84. A line 86 receives the fluid stream leaving through the outlet of the assembly 82. A control fluid is fed to the assembly 82 by a control fluid line 88 connected to the control fluid inlet of the assembly 82, as indicated by the arrow P.

Figure 12:
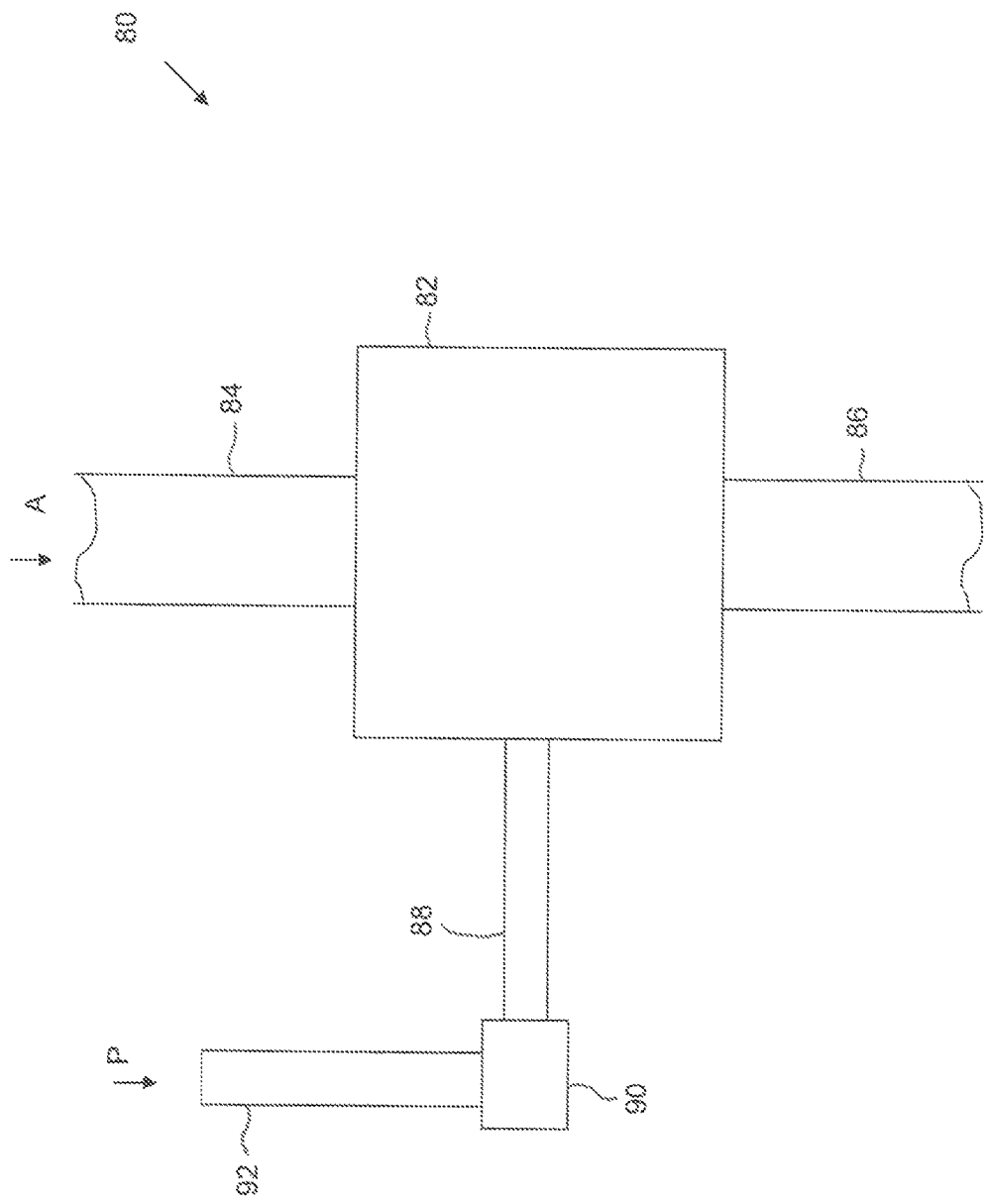
FIG. 12 is a schematic view of an alternative installation comprising an assembly of the present technique.

A similar installation is shown in FIG. 12. The components of the installation of FIG. 8 common to the installation of FIG. 11 are indicated by the same reference numerals and are as described hereinbefore. In the installation of FIG. 12, a regulator 90 is provided to regulate the pressure and flow of the control fluid supplied to the control fluid line 88. The regulator 90 receives control fluid by way of a control fluid supply line 92.

The installations shown in FIGS. 11 and 12 may employ a fluid as control fluid that is different to the fluid of the fluid stream being processed. In this case, the control fluid is drawn from a control fluid supply, for example a reservoir of control fluid.

Figure 13:
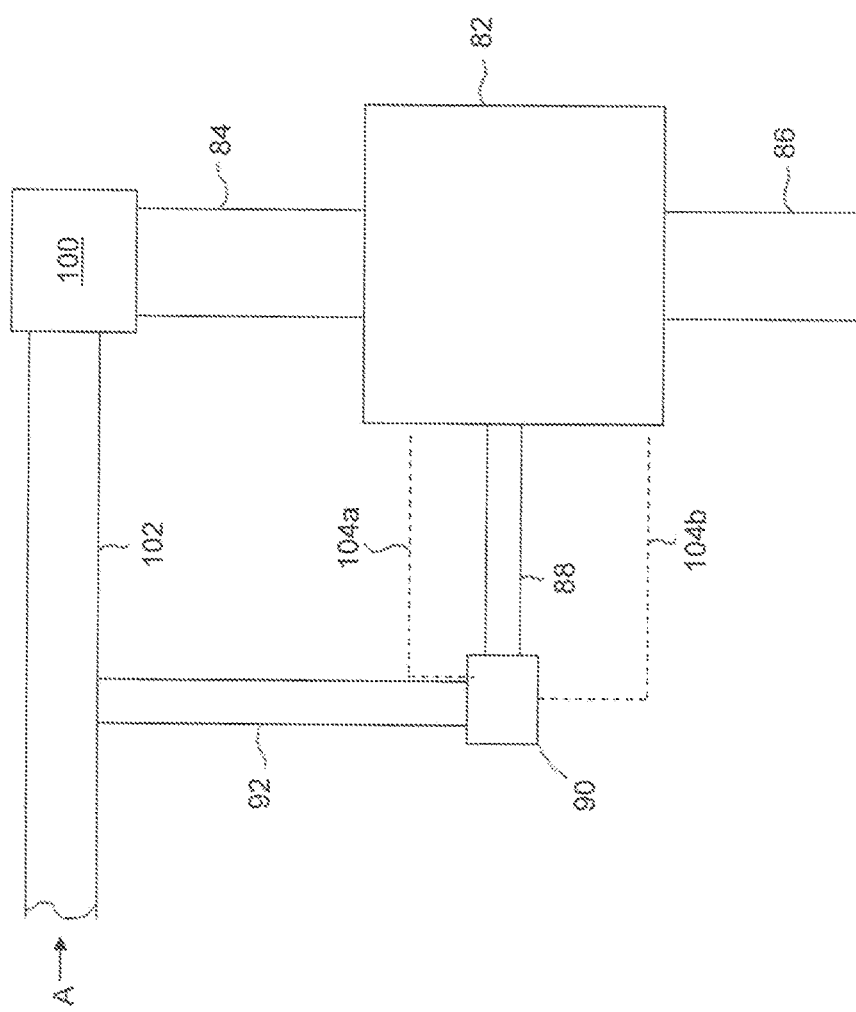
FIG. 13 is a schematic view of a further alternative installation comprising an assembly of the present technique.

As noted above, it is preferable in many circumstances to employ fluid from the fluid stream being processed as the control fluid. An installation of this type is shown in FIG. 13. The components of the installation of FIG. 13 common to the installation of FIGS. 11 and 12 are indicated by the same reference numerals and are as described hereinbefore.

In the installation of FIG. 13, the fluid stream being processed is first reduced in pressure by way of a choke assembly 100 upstream of the assembly 82. The fluid stream is provided to the choke assembly 100 by a fluid stream feed line 102, which may be arranged to receive a fluid stream produced from a subterranean well, for example. Upstream of the choke assembly 100, fluid is removed from the fluid stream at high pressure and fed to the regulator 90 by way of the control fluid supply line 92 and is employed as the control fluid in the assembly 82. The pressure of the control fluid is adjusted by the regulator, for example in response to signals indicating the pressure of the fluid stream within the conduit of the assembly 82 and provided to the regulator by control lines 104a, 104b.

Figure 14:
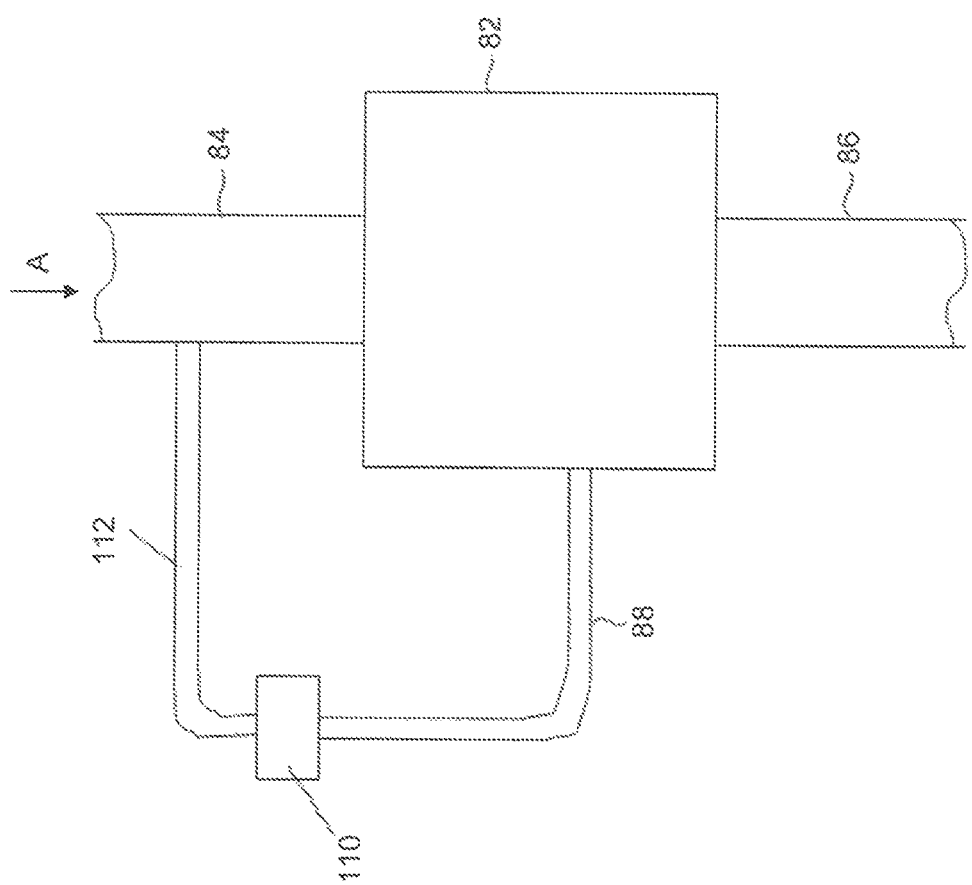
FIG. 14 is a schematic view of a still further installation comprising an assembly of the present technique.

An alternative installation for employing fluid from the fluid stream being processed as the control fluid is shown in FIG. 14. The components of the installation of FIG. 14 common to the installation of FIGS. 11 and 12 are indicated by the same reference numerals and are as described hereinbefore.

In the installation shown in FIG. 14, fluid from the fluid stream upstream of the assembly 82 is removed and fed to a pump 110 by a pump feed line 112. The outlet of the pump 110 is connected to the control fluid line 88 for providing control fluid at the required pressure to the control fluid inlet of the assembly 82. The operation of the pump 110 is controlled to provide the control fluid at the appropriate pressure for achieving the desired control of the flow of the fluid stream within the assembly 82.

Figure 15:
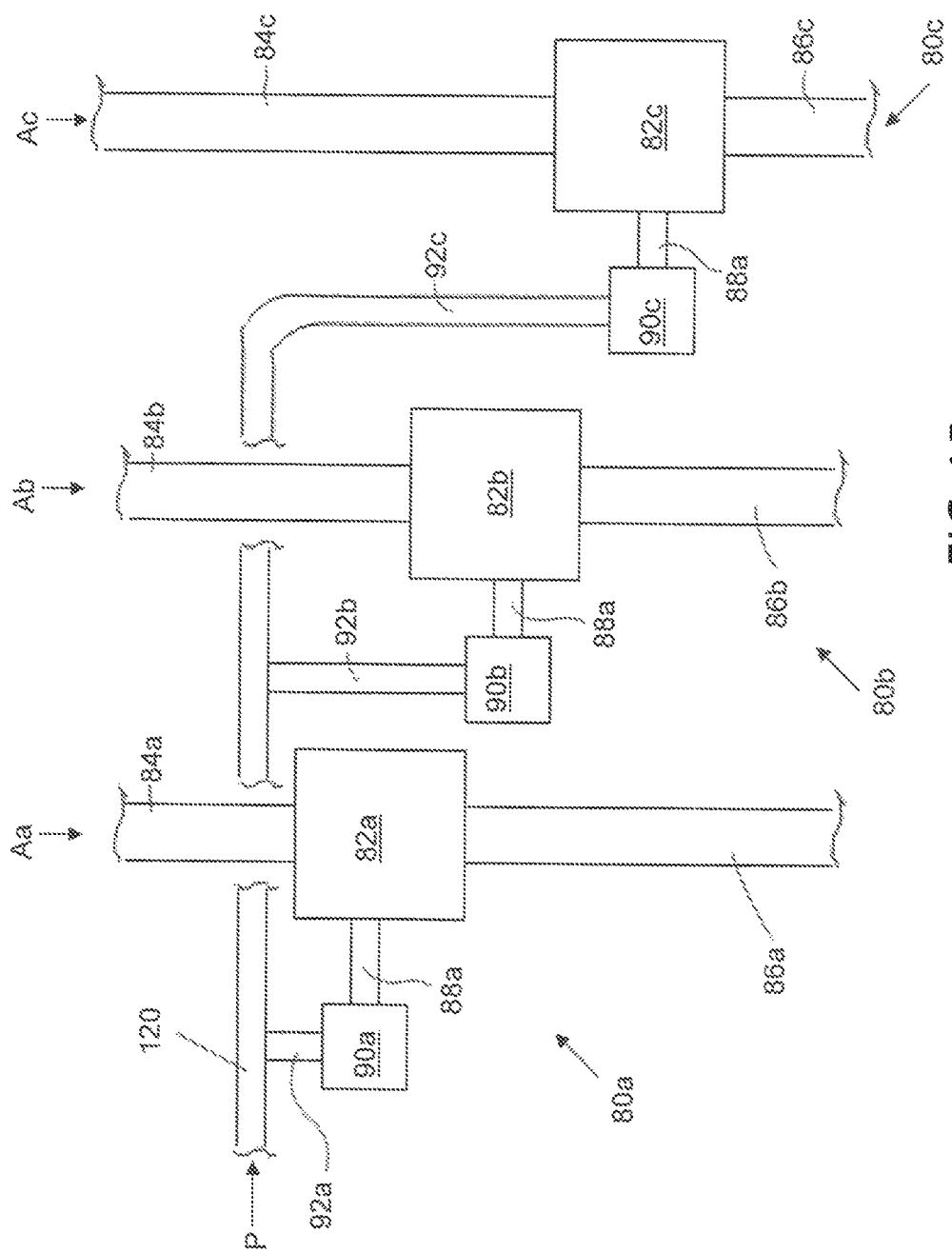
FIG. 15 is a schematic view of an installation comprising a plurality of assemblies of the present technique.

Turning to FIG. 15, there is shown an installation for the control of a plurality of different fluid streams. The installation shown is for the control of three fluid streams and comprises three of the installations 80a, 80b, 80c of the general configuration shown in FIG. 12. The components of the installation of FIG. 15 common to the installation of FIGS. 11 and 12 are indicated by the same reference numerals and are as described hereinbefore. As can be seen, the three installations 80a, 80b, 80c are supplied with a control fluid from a common line 120, connected to each of the control fluid supply lines 92a, 92b, 92c. The flow of fluid in the lines 86a, 86b, 86c downstream of the installations may be individually controlled by appropriate operation of each of the regulators 90a, 90b, 90c, to tailor the flow in each line for downstream handling and processing. For example, the fluid flowing in the lines 86a, 86b, 86c may be adjusted to allow the fluid streams to be combined downstream for combined processing. Alternatively, the fluid streams may be kept separate and processed individually.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An assembly, the assembly comprising:
 a fluid flow conduit configured to carry a process fluid stream, the fluid flow conduit defining a first inlet and a first outlet; and
 a control fluid feed assembly coupled to the fluid flow conduit and defining a second inlet configured to receive a control fluid, wherein the control fluid feed assembly comprises:
  a control portion defining one or more apertures that extend through the control portion, the control portion being disposed between the first inlet and the first outlet of the fluid flow conduit, wherein the control portion is configured to direct a control fluid through the one or more apertures to form a fluid venturi that restricts the flow of the process fluid stream through the fluid flow conduit.

2. The assembly according to claim 1, wherein a longitudinal axis of the fluid flow conduit lies on a substantially straight line, and one or both of the first inlet and the first outlet lie on the longitudinal axis.

3. The assembly according to claim 1, wherein the control portion comprises a wall with an inner layer and an outer layer.

4. The assembly according to claim 3, wherein the inner and outer layers are formed from different materials, the inner and outer layers have different hardnesses, the inner layer comprises tungsten or a nickel-chromium-based alloy while the outer layer comprises stainless steel, or a combination thereof.

5. The assembly according to claim 1, wherein the control fluid feed assembly comprises a first conduit member defining a second inlet, and a second conduit member defining a second outlet, and wherein the control portion is between the first conduit member and the second conduit member.

6. The assembly according to claim 5, wherein the control portion comprises a material that is harder than the material of the first and/or second conduit members.

7. The assembly according to claim 1, wherein the control fluid feed assembly comprises a control fluid conduit extending between the inlet for the control fluid and the one or more apertures, and the control fluid conduit comprises a chamber disposed between the inlet for the control fluid and the one or more apertures.

8. The assembly according to claim 7, wherein the chamber is an annular chamber extending around the control portion.

9. The assembly according to claim 8, wherein the annular chamber is tapered in the direction of flow of control fluid along the chamber around the control portion, and the cross-sectional area of the annular chamber decreases in the direction of flow of the control fluid around the control portion.

10. The assembly according to claim 7, wherein a region of the control fluid conduit that opens into the chamber extends at an angle to a longitudinal axis of the control portion of the conduit.

11. The assembly according to claim 10, wherein the region of the control fluid conduit that opens into the chamber extends tangentially to the chamber.

12. The assembly according to claim 1, wherein the one or more apertures are arranged in a plurality of rows extending circumferentially around the control portion.

13. The assembly according to claim 12, wherein the one or more apertures vary in cross-sectional area from one row to another row in the plurality of rows.

14. The assembly according to claim 12, wherein the one or more apertures decrease in cross-sectional area from one row to another row in the plurality of rows.

15. The assembly according to claim 12, wherein each aperture of the one or more apertures extends through a wall of the control portion at an angle to a radially inwards direction relative to a longitudinal axis of the control portion.

16. The assembly according to claim 15, wherein each aperture of the one or more apertures extends through the wall of the control portion tangentially to an inner surface of the control portion, each aperture of the one or more apertures extends through the wall of the control portion at an angle to a radially inward direction and in an upstream or downstream direction, or a combination thereof.

17. The assembly according to claim 15, wherein one or more of the one or more apertures has a quadrilateral cross-section, a rectangular cross-section, or a combination thereof.

18. The assembly according to claim 1, wherein the control fluid feed assembly comprises a pressure regulator configured to control the flow of the control fluid, a pressure sensing assembly configured to measure a fluid pressure at one or more positions along the control fluid feed assembly, and the control fluid feed assembly defines one or more pressure sensing ports.

19. A method for controlling a flow of a process fluid stream, the method comprising:
 directing a control fluid through a control fluid feed assembly;
 forming a fluid venturi in a control portion of the control fluid feed assembly; and
 directing the process fluid stream through the fluid venturi in the control portion.

20. An assembly for the control of the flow of a fluid stream, the assembly comprising:
 a fluid flow conduit having a longitudinal axis;
 a first inlet in the conduit for the fluid stream being processed;
 an outlet in the conduit for the fluid stream being processed; and
 a control fluid feed assembly having an inlet for a control fluid;
 wherein the control fluid feed assembly comprises a control portion comprising a plurality of apertures arranged in a plurality of rows extending circumferentially around the control portion, wherein each row comprises one or more apertures of the plurality of apertures, the control portion being disposed between the first inlet and the outlet of the fluid flow conduit, the plurality of apertures being in flow communication with a second inlet of the flow control assembly and extending in a direction at an angle to the longitudinal axis of the fluid flow conduit;
 whereby in use the control fluid supplied to the second inlet of the control fluid assembly is caused to flow into the fluid flow conduit through the one or more apertures.

* * * * *